(12) United States Patent
Patton et al.

(10) Patent No.: US 8,154,778 B2
(45) Date of Patent: Apr. 10, 2012

(54) SYSTEMS AND METHODS FOR COLOR CORRECTION PROCESSING AND NOTIFICATION FOR DIGITAL IMAGE DATA GENERATED FROM A DOCUMENT IMAGE

(75) Inventors: Ronnie N. Patton, Lake Oswego, OR (US); Charles E. Pierson, Vancouver, WA (US); Neil J. Runde, Brush Prairie, WA (US); Jon M. Speigle, Vancouver, WA (US)

(73) Assignee: Sharp Laboratories of America, Inc, Camas, WA (US)

( * ) Notice: Subject to any disclaimer, the term of this patent is extended or adjusted under 35 U.S.C. 154(b) by 396 days.

(21) Appl. No.: 11/940,645

(22) Filed: Nov. 15, 2007

(65) Prior Publication Data
US 2009/0128871 A1    May 21, 2009

(51) Int. Cl.
*G03F 3/08* (2006.01)
(52) U.S. Cl. ......... 358/518; 358/2.1; 715/246; 715/275; 715/729
(58) Field of Classification Search .......... 345/582–629; 358/520; 382/167
See application file for complete search history.

(56) References Cited

U.S. PATENT DOCUMENTS

| | | | |
|---|---|---|---|
| 5,311,212 A | 5/1994 | Beretta | |
| 5,509,111 A | 4/1996 | Hong et al. | |
| 5,589,898 A | 12/1996 | Atkinson | |
| 6,045,515 A | 4/2000 | Lawton | |
| 6,075,927 A | 6/2000 | Sakai et al. | |
| 6,309,117 B1 | 10/2001 | Bunce et al. | |
| 6,591,008 B1 * | 7/2003 | Surve et al. ............ 382/162 |
| 6,809,741 B1 | 10/2004 | Bates et al. | |
| 6,873,806 B2 * | 3/2005 | Kobayashi et al. .......... 399/80 |
| 7,024,022 B2 | 4/2006 | Harrington et al. | |
| 7,124,375 B1 | 10/2006 | Steele et al. | |
| 7,136,511 B2 | 11/2006 | Harrington et al. | |
| 7,145,571 B2 * | 12/2006 | Jones et al. .......... 345/589 |
| 2004/0027594 A1 * | 2/2004 | Suzuki et al. .......... 358/1.2 |
| 2005/0280872 A1 | 12/2005 | Noel | |
| 2006/0011718 A1 | 1/2006 | Kurzweil et al. | |
| 2006/0033880 A1 | 2/2006 | Korneluk | |
| 2006/0071938 A1 | 4/2006 | Richardson et al. | |
| 2006/0155699 A1 | 7/2006 | Purvis et al. | |
| 2006/0209258 A1 | 9/2006 | Nareppa et al. | |

(Continued)

FOREIGN PATENT DOCUMENTS
JP    10-336469    12/1998
(Continued)

*Primary Examiner* — Benny Tieu
*Assistant Examiner* — Marcellus Augustin
(74) *Attorney, Agent, or Firm* — Duft Bornsen & Fishman LLP

(57) ABSTRACT

Systems and methods for generating color corrected digital image data from a document image according to personal preferences of an identified user of the digital image copy. A color correction profile is provided defining color correction parameters for a particular identified user. The digital image copy is generated in accordance with the color correction profile by replacing problematic colors with alternate presentations as defined by the color correction parameters. The alternate presentations may include corrections to compensate for colorblindness of an identified user. The document image may be logically segmented to identify objects associated with each of a plurality of segments of the document image such as text, graphics, photographic images, etc. The color correction profile may define different color correction parameters to be associated with each defined type of segment.

22 Claims, 9 Drawing Sheets

U.S. PATENT DOCUMENTS

2006/0280364 A1 * 12/2006 Ma et al. .................. 382/173
2007/0061384 A1    3/2007 Harrington et al.

FOREIGN PATENT DOCUMENTS

| JP | 2002014895 | 1/2002 |
| JP | 2002298133 | 10/2002 |
| JP | 2004112140 | 4/2004 |
| JP | 2006246072 | 9/2006 |
| WO | WO2006/054242 * | 5/2006 |
| WO | WO 2006/054242 A2 | 5/2006 |

* cited by examiner

SYSTEMS AND METHODS FOR COLOR CORRECTION PROCESSING AND NOTIFICATION FOR DIGITAL IMAGE DATA GENERATED FROM A DOCUMENT IMAGE

BACKGROUND

1. Field of the Invention

The invention relates to color correction in digital processing of digital image data generated from a document image and in particular relates to modifications of colors in digital image data responsive to a user's preferences indicating problematic colors such as for a color-blind user (or other identified colors) and alternate presentations to replace the identified colors for various types of segments of the digital image data.

2. Discussion of Related Art

Color printing, copying, and scanning of an original document image has grown to a critical need in many business and personal applications. However, many viewers or users of such color documents have problems discriminating between certain colors, especially certain colors in the context of other color backgrounds. For example, a common form of color-blindness makes distinguishing red from green colors difficult. Other forms of color-blindness make distinctions between blue and yellow difficult to discern. Even outside the context of a color-blind user, some color combinations present difficulties for a variety of users to distinguish.

Computing applications adapted to generate an initial original color document may allow for a variety of color modifications or alterations to improve readability of the document when the original document is created. For example, it is common for a print dialog box in a Windows computing environment to allow a user to adopt certain color adaptations when the original document is created. However, when generating a digital image copy of such a color document image after initial creation of the document image, a particular user or recipient of the digital image may require particular color alterations or corrections according to their personal preferences to distinguish a variety of problematic colors. Thus the original document can be created with certain color alterations but a later digital image copy of the altered document image may not provide suitable correction for a particular user. As used herein, a "digital image copy" or "digital image data" of a document image refers to a digital or digitized version of the document image such as is produced by operation of a color scanner or other image digitizing devices and systems. Such a digital image copy may be applied to a printer to generate a physical or paper copy of the document image such as may be produced on a color copy machine (e.g., a device that scans the color document image and reprints a copy of the document image from the scanned digital image). Further, a digital image copy may be stored for subsequent utilization or may be transmitted to a remote device for utilization (e.g., by network transmission and/or facsimile transmission). Still further, the digital image data may be presented to a user of a viewer application program coupled to a display unit for further utilization by the user.

Although many computing applications used for generating an original color document may allow for a variety of color modifications or alterations, in producing the original document image present solutions for color correction or modification of a digital image copy of an already generated document image present a number of problems. For example, some current color correction techniques for correcting a digital image data remap all pixels of the document image to shift the color gamut or contrast. Such non-selective, overall modifications to a digital image copy of a document image may improperly alter colors in elements of the document image to an extent that the document image is unusable. For example, overall remapping of all colors in a document image may seriously degrade color photographs in the digital image copy of the document image or may improperly shift colors in a graphic object (e.g., a corporate logo) so as to incorrectly represent the intended information. Further, present solutions fail to adequately notify a user of the digital image copy of the document image that the colors have been so modified. Devoid of such notification, a user may be misled by reading information directing attention to certain objects referenced by color. For example, if a document describes an associated graphical object in the document with reference to "red lines" on the document image copy but the red lines have been "corrected" to blue, the user may not know that the correction was applied and may be confused by the document content.

It is evident from the above discussion that a need exists for improved systems and methods for flexible, selective, color correction in a digital image copy of a document image.

SUMMARY

The present invention solves the above and other problems, thereby advancing the state of the useful arts, by providing systems and methods for flexibly and selectively modifying colors in a digital image copy of a document image in accordance with a user's preferences and for notifying a user of such color corrections that have been applied.

In one aspect, a method is provided for color correction in generating a digital image copy of a document image. The method includes obtaining a color correction profile for an identified user wherein the color correction profile indicates problematic colors to be altered in a digital image copy of the document image based on the identified user's visual preferences. The method then includes generating the digital image copy of the document image using an alternate presentation in accordance with the color correction profile and outputting the generated digital image copy for use by the identified user. The color correction profile specifies color correction parameters for an alternate presentation of the problematic colors to correct for colorblindness of the identified user.

In another aspect, a method is provided for color correction in generating a digital image copy of a document image. The method includes logically dividing the document image into a plurality of segments wherein each segment contains identified elements of the document image. The method then obtains a color correction profile for an identified user wherein the color correction profile includes a plurality of color correction parameters each associated with a different corresponding segment of the plurality of segments wherein each of the plurality of color correction parameters includes identification of problematic colors for the corresponding segment and includes identification of alternate presentations for the problematic colors in the corresponding segment. The method then generates the digital image copy of the document image using an alternate presentation in accordance with the color correction profile wherein the step of generating further comprises altering problematic colors in each segment of the document image in accordance with corresponding color parameters in the color correction profile. The generated digital image copy is then output for use by the identified user.

Still another aspect hereof provides a system for color correction of a digital image copy of a document image. The system includes a color correction profile corresponding to an identified user wherein the profile indicates colors to be altered in a digital image copy of the document image based on the identified user's visual preferences. The system further includes a color corrected digital image copy module coupled to receive the color correction profile and adapted to generate the digital image copy of the document image for the identified user with an alternate presentation in accordance with the color correction profile. Further, the system includes an output module coupled to receive the generated digital image copy and to present the digital image copy to a user. The color correction profile specifies color correction parameters for an alternate presentation of the problematic colors to correct for colorblindness of the identified user.

Yet another aspect hereof provides a multi-function device adapted to generate a digital image copy of a document image with alternate presentation of problematic colors. The device includes a scanner to generate a digital image copy of the document image and a color correction profile defining problematic colors to be replaced with alternate presentations in the digital image copy in accordance with a user's visual preferences. The device further includes a color corrected digital image copy module coupled to receive the digital image copy and coupled to receive the color correction profile and adapted to replace colors with altered colors in the digital image copy of the document image in accordance with the color correction profile. Further, the device includes an image output module coupled to receive the altered digital image copy and adapted to present the altered digital image copy to a user.

DETAILED DESCRIPTION OF THE DRAWINGS

Figure 1:
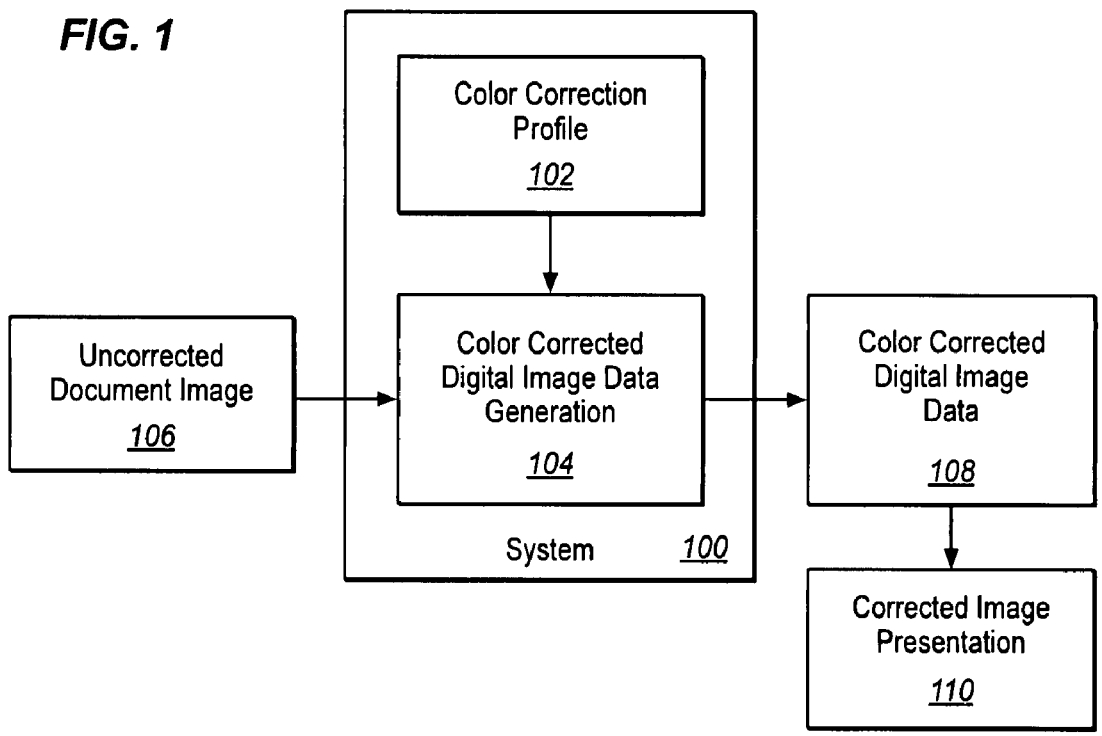
FIG. 1 is a block diagram of an exemplary system for generating color corrected digital image data from a document image in accordance with features and aspects hereof.

FIG. 1 is a block diagram of an exemplary system 100 in accordance with features and aspects hereof in which a color corrected digital image data generation module 104 receives an uncorrected document image 106 and generates color corrected digital image data 108 of the document image in accordance with information in the color correction profile 102. The color corrected digital image data generation module 104 determines from the profile 102 what colors present problems for the identified user and what alternate presentations should be used to replace the indicated problematic colors. Module 104 then generates the color corrected digital image data 108 of the original document image 106 replacing the identified problematic colors in the digital image copy of the document image with alternate presentations. The color corrected digital image data 108 may then be utilized by corrected image presentation module 110. As noted above, utilization may include printing the color corrected digital image copy for presentation to a user and/or transmitting the color corrected digital image copy via network or facsimile media and protocols for utilization by a remote user. In addition, presentation module 110 may simply store the color corrected digital image copy for later utilization by printing and/or transmitting.

As used herein "alternate presentations" means any alternative to the original color presentation in the original document image. For example, to compensate for color-blindness, alternate colors may be used in the digital image copy to replace identified problematic colors in the original document image. Or, for example, as another alternate presentation, problematic colors may be replaced by cross-hatch or other image patterns representing the problematic colors. Still further, alternate presentations may involve any transformations of the problematic colors in the original document image into an alternate presentation applied to the digital image copy as applied to output presentation module 110. For example, problematic colors may be replaced by blinking or flashing image data in the digital image copy for presentation on a display screen. Still further by way of example, alternate presentations may simply alter the contrast of a color in the digital image copy or may convert certain colors (or all colors) to grayscale tones in the document image copy. Thus "alternate presentations" means any possible transformation of the problematic colors in the original document image into a different presentation in the color corrected digital image data.

The color correction profile 102 reflects the particular preferences of an associated, identified user to whom the generated copy is to be presented. The profile information may be dynamically generated as an aspect of the operation of system 100 in generating the particular color corrected digital image data 108 or the profile information may be previously defined and stored within the system 100 and thus retrieved by module 104 when generating the particular color corrected digital image data 108 for a particular user associated with a color correction profile 102.

Color corrected digital image generation module 104 may apply image segmentation techniques to identify pixels of the document image that have a common type in the uncorrected document image 106 and thus group them in a common segment type. Module 104 may then utilize corresponding color correction parameters for each type of segment as identified in the color correction profile 102. As discussed further herein below, color correction profile 102 may include different color correction parameters associated with each of multiple segments of the uncorrected document image 106. Exemplary details of such segmentation of the document image and application of associated color correction parameters are discussed further herein below.

Figure 2:
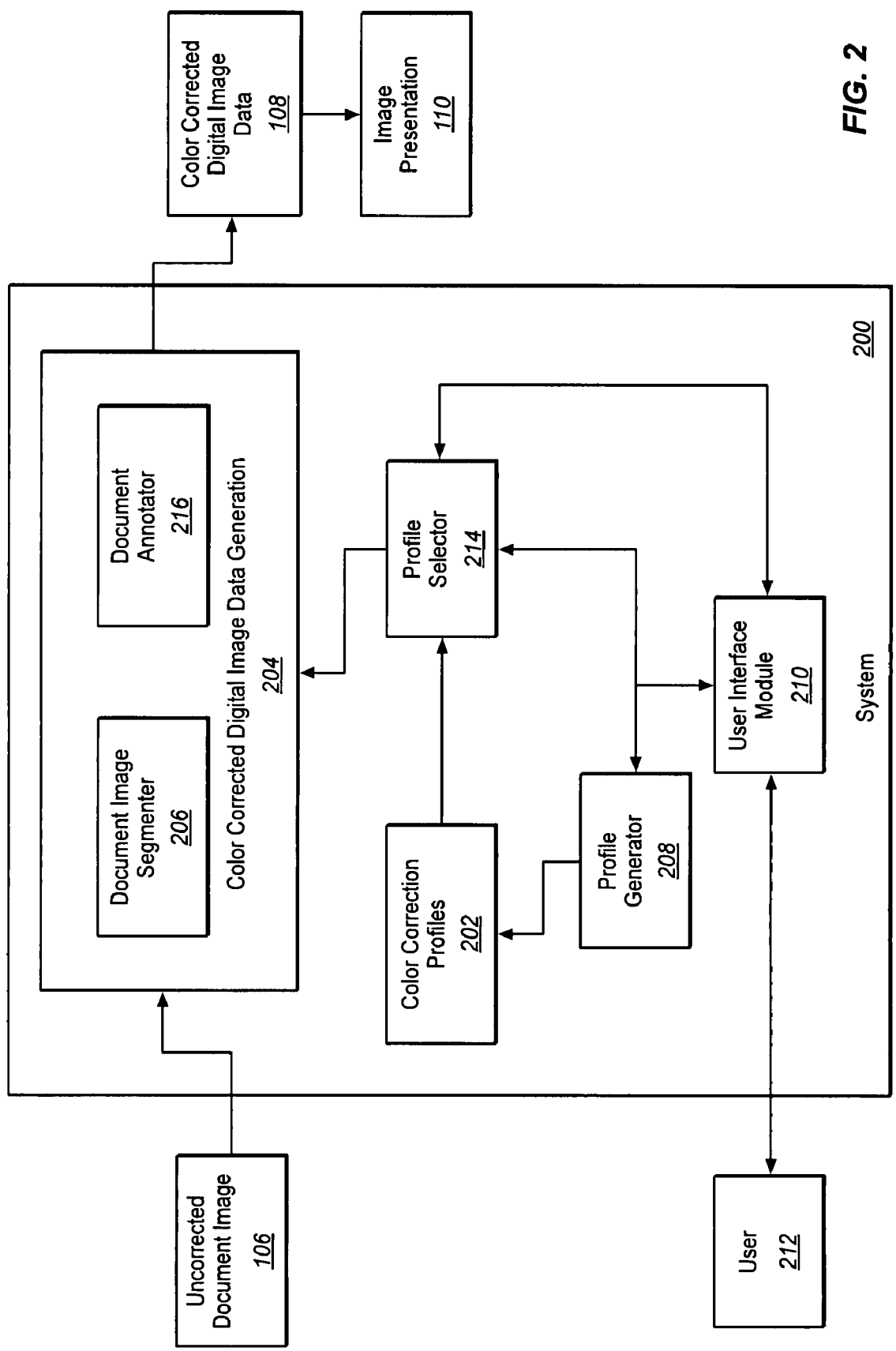
FIG. 2 is a block diagram of another exemplary system for generating color corrected digital image data from a document image in accordance with features and aspects hereof.

FIG. 2 is a block diagram of another exemplary system 200 in accordance with features and aspects hereof. As above with respect to FIG. 1, system 200 of FIG. 2 receives and uncorrected document image 106 and applies appropriate color correction to generate color corrected digital image data 108 which may then be utilized by corrected image presentation module 110 (e.g., printing, storage, or transmission of the color corrected digital image data 108). Color corrected digital image data generation module 204 receives a selected color correction profile 202 via profile selector element 214. Profile selector element 214 may interact through user interface module 210 to present options to user 212 for dynamically generating a new color correction profile and/or to select from a previously defined and stored color correction profile 202. Where the user 212 generates a request generation of a new color correction profile, profile generator module 208 may interact with user 212 through user interface module 210 to generate a new color correction profile 202. Color correction profiles 202 may be stored in any suitable memory element associated with system 200 to allow persistent storage and later retrieval by profile generator 208 and profile selector 214, respectively.

Utilizing the selected or generated color correction profile provided by profile selector 214, color corrected digital image data generation module 204 is next operable to segment a copy of the uncorrected document image 106 utilizing document image segmenter 206. Any of several well-known image segmentation techniques may be utilized within segmenter 206. Preferably, image segmenter 206 applies well-known graphical analysis techniques to identify a variety of types of elements within the uncorrected document image 106. For example, image segmenter 206 may identify all pixels of the document image 106 that represent textual information (e.g., character glyphs recorded as pixels in the document image 106). All such textual information may be associated with a first segment type of the document image 106. A variety of other types of segments may be similarly logically defined by image segmenter 206. A type of segment may be associated with each of a variety of objects identified in the document image. The types of objects and related segment types may include: graphical objects (e.g., clip art, logos, etc.), photographic elements (photographic and other image content), background elements (e.g., a color filled or watermark filled background image applied to all or a significant portion of the document image 106), a solid area fill (e.g., a rectangle or other polygonal, closed object filled with a color), etc. Each such defined type of segment of the document image may have a different, associated set of color correction parameters defined within the selected color correction profile 202 selected by profile selector 214. For each such identified segment type of the document image 106, color corrected digital image data generation 204 applies the corresponding color parameters for all objects of that segment type in the copy to generate the color corrected digital image data 108. In addition, color corrected digital image data generation 204 may include document annotator 216 operable to annotate the color corrected digital image data 108 to indicate that color correction modifications have been applied to the color corrected digital image data 108. The annotation generated may also identify the specific color alterations applied to color corrected digital image data 108.

Figure 3:
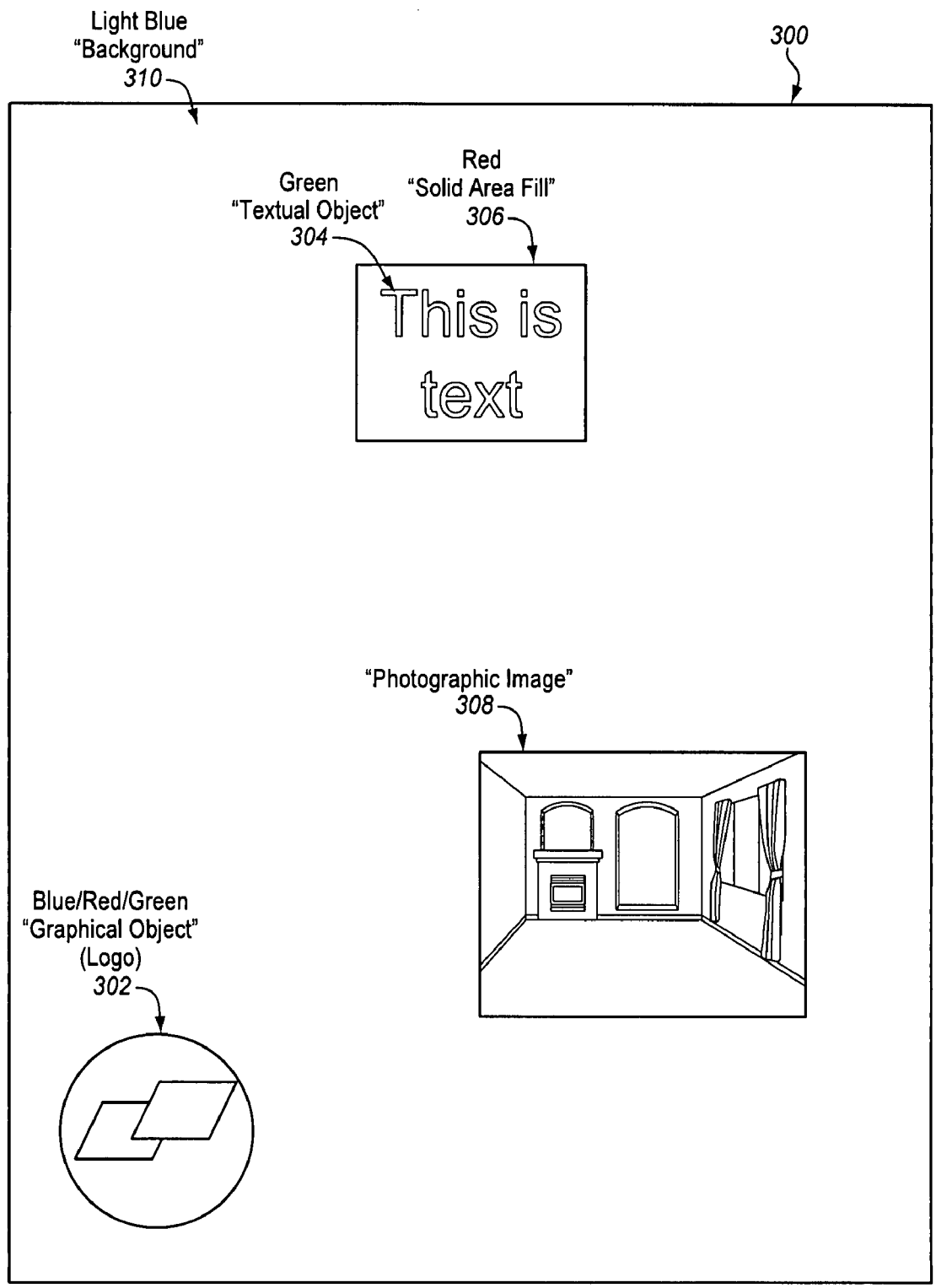
FIG. 3 is a diagram of an exemplary document image with identified segments with uncorrected colors.

FIG. 3 is a diagram representing an uncorrected document image 300 with a number of different objects in the document image. A graphical object 302 (e.g., a corporate logo or other object) is shown as green and red polygons on a blue circle background. Textual object 304 appears on the page representing standard characters presented as glyphs from a selected font. The characters are shown as a greenish color on a reddish background solid area object 306. A photographic image object 308 is also shown on document image 300. All of these objects are shown as overlaid on a solid background 310 of light blue.

Figure 4:
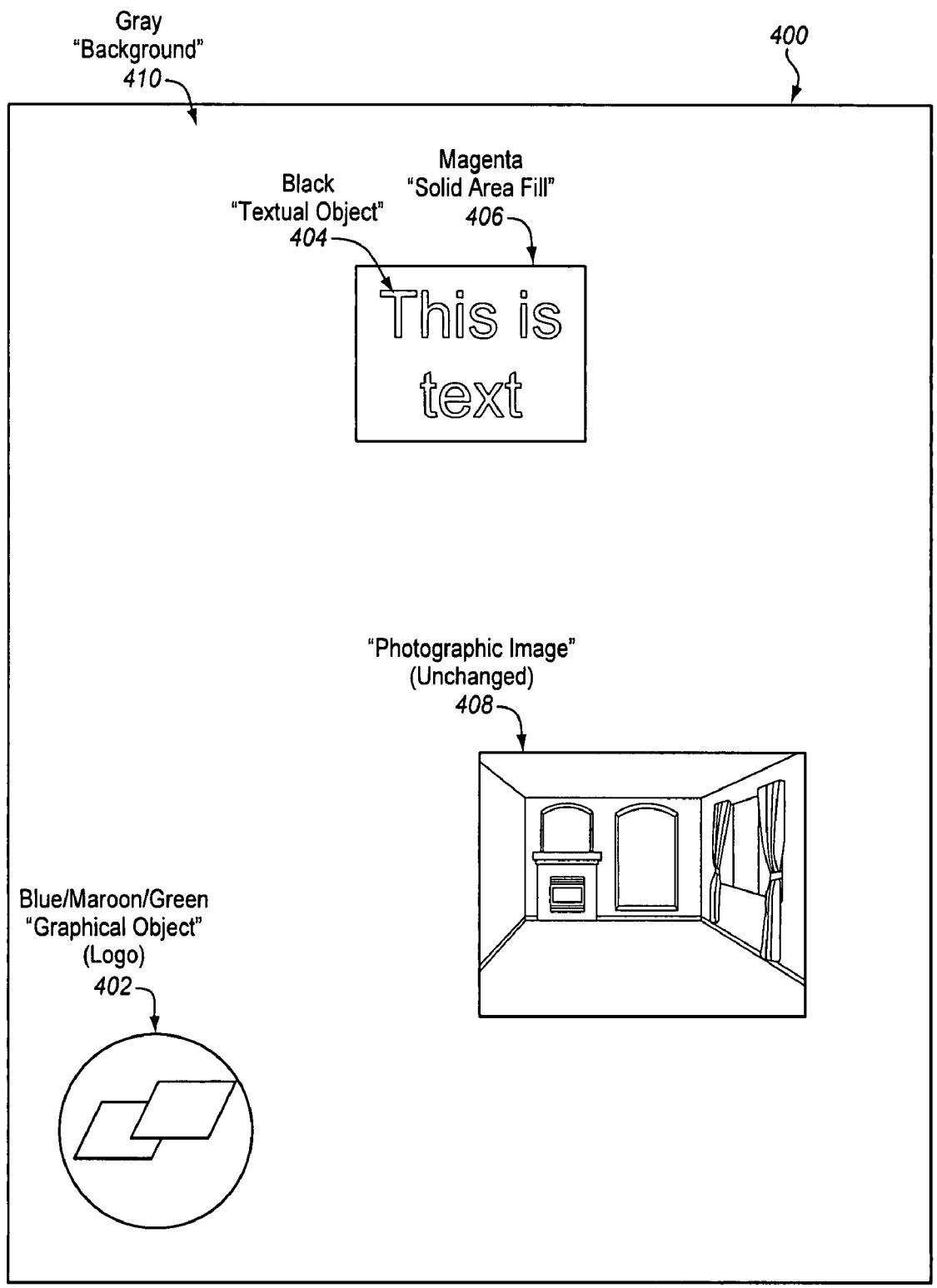
FIG. 4 is a diagram of an exemplary color corrected digital image copy of the document of FIG. 3 with various segments color corrected in accordance with features and aspects hereof.

Each of these objects are associated with a corresponding segment type and hence associated with corresponding color correction parameters in a user's predefined color correction profile. FIG. 4 depicts a color corrected digital image copy 400 generated from the original, uncorrected document image 300 of FIG. 3. In accordance with a particular, identified user's color correction profile, the background color 410 has been changed from a light blue to a gray color. Text 404 has been changed to a solid black color and the solid color area fill 406 on which the text is placed has been changed to a magenta color. The red polygon within graphic object 402 has been changed to a maroon color to increase its contrast with the green polygon against the blue background of the object 402. Photographic image object 408 has been left unchanged as regards any color modifications. These exemplary changes are intended to represent the types of changes that may be defined for each of a plurality of types of segments in an identified user's profile.

Figure 5:
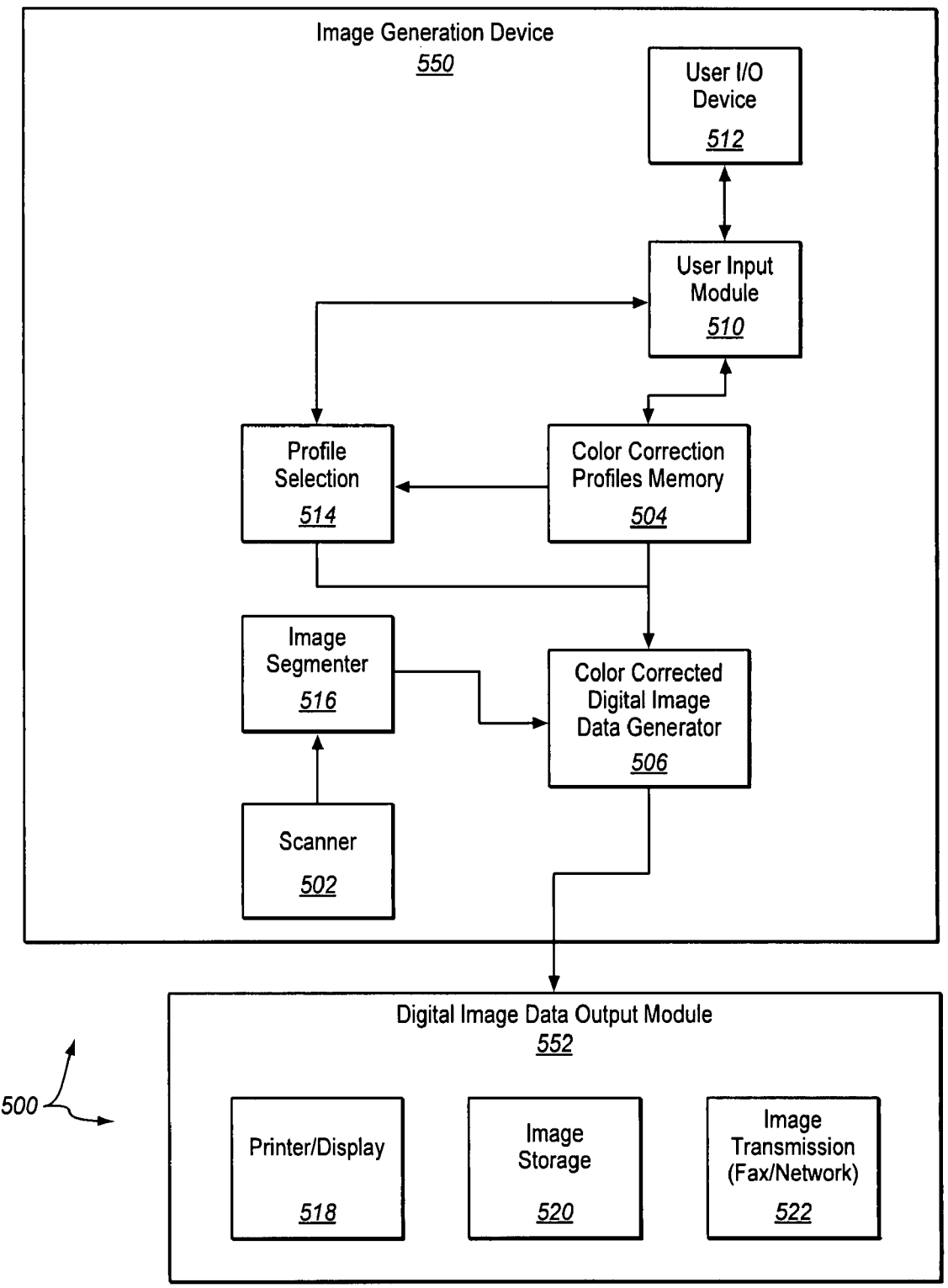
FIG. 5 is a block diagram of an exemplary multi-function device for generating color corrected digital image data from a document image in accordance with features and aspects hereof.

FIG. 5 is a block diagram describing another exemplary system 500 for generating and presenting a color corrected digital image copy of an original document image in accordance with features and aspects hereof. System 500 provides flexible color correction defined by a color correction profile associated with an identified user. System 500 includes an image generation device 550 coupled to a digital image data output module 552 for presentation of the color corrected digital image data generated by device 550. Those of ordinary skill in the art will recognize that the output/presentation module 552 may be integrated with the generation module 550 as a single physical device or may be separated as distinct devices. For example, system 500 may be a so called "multi-function device" (or "multi-function peripheral") wherein the image generation module 550 is operable to generate the color corrected digital image data and the output module 552, physically integrated with module 550, includes a printing capability to generate a paper copy of the digital image data as well as transmission capabilities to send the image to a remote user (e.g., a remote facsimile machine). Or, for example, system 500 may include a computing system 550 adapted to generate a color corrected digital image data coupled to and/or integrated with a display element as part of the output module 552. Thus a computing application program operable on a system 550 may generate the color corrected digital image data from an original document image by interacting with a user and may present the corrected data for viewing by the user on a display screen of the output module 552. Again, those of ordinary skill in the art will recognize a wide variety of other systems and environments wherein a color corrected digital image copy of an original document image is produced and utilized by a user of the system 500.

Device 550 may include a scanner 502 for digitizing an original document image (not shown) for application to the color corrected digital image data generator 506 through image segmenter 516. The digital image copy of the document produced by scanner 502 represents in digital form the true colors of the original document image. Image segmenter 516 optionally analyzes the original document image to identify objects (segments) of the image to associate each object with one of a plurality of types of segments. As noted above, such segment types may include, for example, textual segments, graphic objects segments, photographic image segments, solid area fill segments, and background segments. The digital image copy so segmented into a plurality of types of information is then applied to color corrected digital image data generator 506 to apply color correction in accordance with the color correction profile selected by a profile selection element 514. In particular, objects associated with each segment type are corrected by altering the colors in the object according to the color correction parameters of the profile associated with a corresponding type of segment.

Profile selection 514 interacts with user input module 510 and user I/O device 512 to permit the user to either define a new color correction profile or to select a previously defined color correction profile stored in memory 504. User input module 510 using user I/O device 512 interacts with the user preferably by presenting a graphical user interface on the user I/O device representing comparative color information such that a user may indicate problematic colors and may also indicate alternate presentations to be used for replacing the identified problematic colors. User input module 510 through user I/O device 512 may define such color parameters for each of the plurality of segment types in an original document image.

Responsive to generation of a color corrected digital image data by color corrected digital image data generator 506, the color corrected digital image data is applied to output module 552 for utilization. As noted above, utilization may include printing or display through printer/display 518, persistent storage in copy storage memory 520, or copy transmission by element 522 utilizing facsimile or network communication media and protocols. Thus the generated, color corrected, digital image data may be presented locally for use by printing or displaying the image data, may be stored for later utilization, and/or may be transmitted to a remote user/device for remote utilization of the image data. These and other options to utilize the generated digital image data will be readily apparent to those of ordinary skill in the art.

Figure 6:
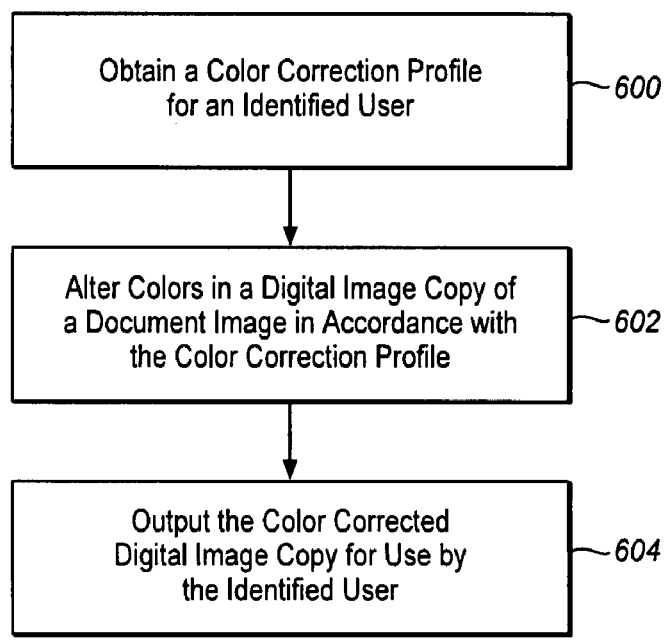
FIG. 6 is a flowchart describing an exemplary method operable in systems such as those of FIGS. 1, 2, and 5 to generate a color corrected digital image data generated from a document image in accordance with features and aspects hereof.

FIG. 6 is a flowchart broadly describing a method in accordance with features and aspects hereof to generate color corrected digital image data generated from an original document image in accordance with a particular selected color correction profile corresponding to an identified user. The method of FIG. 6 may be operable on systems such as those described in FIGS. 1, 2, and 5. Step 600 is first operable to obtain a color correction profile for an identified user. Processing in step 600 may include interacting with a user to identify a particular user and to retrieve a color correction profile previously defined and stored for the identified user. In addition or in the alternative, processing of step 600 may include interacting with a user to generate a new color correction profile and optionally to associate the newly generated profile with an identified user.

Step 602 is then operable to alter the colors in a digital image copy of the document image in accordance with the color correction profile selected for the identified user by operation of step 600. As noted above, the selected color correction profile may include a variety of different color correction parameters each corresponding to a particular type of segment in the document image. Step 602 may therefore optionally include analyzing the document image to segment objects in the image into a variety of segment types. Step 602 may then apply the color correction parameters to each object in accordance with the parameters corresponding to the type of segment associated with each object. Step 604 is then operable to output the color corrected digital image copy generated by operation of step 602. Output of the color corrected digital image copy may include storing the copy for later use, printing or displaying the digital image data with corrected colors, and/or utilizing well-known network and/or facsimile transmission media and protocols to transmit the color corrected digital image copy for use by a remote user.

Figure 7:
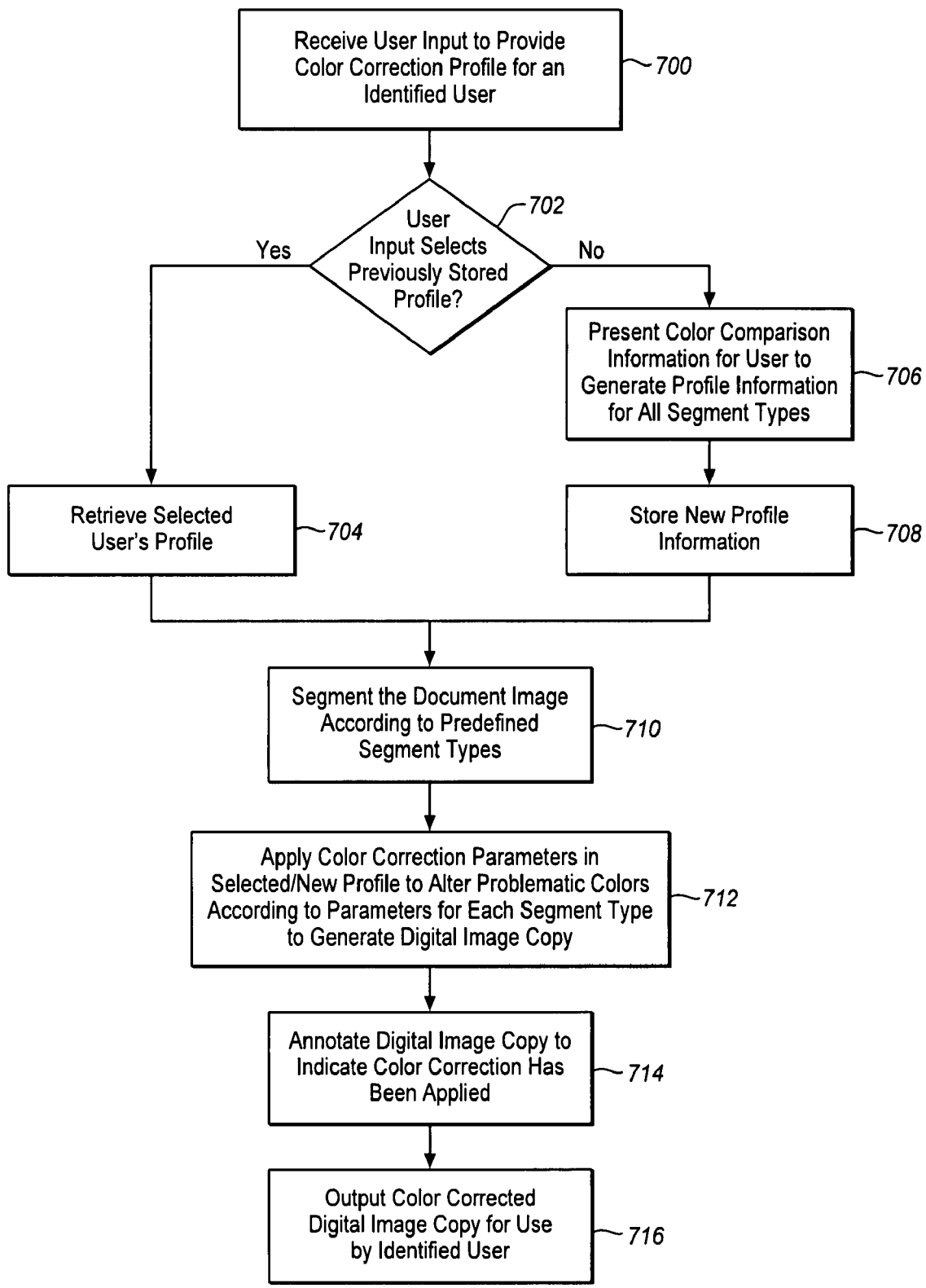
FIG. 7 is a flowchart describing another exemplary method operable in systems such as those of FIGS. 1, 2, and 5 to generate a color corrected digital image data generated from a document image in accordance with features and aspects hereof.

FIG. 7 is a flowchart describing another method in accordance with features and aspects hereof for generating a color corrected digital image copy of a document in accordance with a selected, identified user's color correction profile information. Step 700 is first operable to receive user input to provide a color correction profile for an identified user. Such user input may be provided using any suitable graphical user interface to permit a user to request definition of a new profile or to select a previously defined and stored color correction profile previously associated with an identified user. If step 702 determines that the user input requested selection of a previously defined and stored profile, step 704 is next operable to retrieve the selected, previously stored user profile to obtain color correction parameter information therein. Processing then continues to step 710 as discussed further herein below.

If step 702 determines that the user input requests definition of a new color correction profile, steps 706 and 708 are next operable to define a new color correction profile and store the profile in conjunction with an associated, identified user. Specifically, step 706 presents color comparison information on the user interface to allow a user to compare typical problematic colors and thus identify which of the typical colors present problems to the user. Having so identified particular problematic colors, alternate presentations may be selected/determined and the particular color correction methodology and colors for each type of segment in the document image may be thus defined. The new generated color correction profile is then stored by step 708 and associated with an identified user (e.g., the user that defined the new profile or another identified user).

Step 710 is next operable to optionally apply well-known image segmentation techniques to the document image. The image segmentation determines portions of the document image that represent each of a plurality of types of segments in the original document image. As noted above, any number of types of segments may be defined. For example, in one possible image segmentation, a first segment may represent textual information and a second segment may represent all non-textual information in the original document image. Or, for example, a first segment may represent all textual type of information, a second segment may represent photographic information, a third segment may represent other graphical objects, yet another type of segment may represent all solid area fills, and still another type may represent background or watermark objects on the original document image. Thus any number of segment types may be defined including zero (or one) segments, or optional segmentation may be skipped, such that all data in the original document image is corrected according to the same set of color correction parameters.

Following optional segmentation of the original document image, step 712 is then operable to apply the color correction parameters in the selected new profile to alter problematic colors according to the parameters for each segment type. As noted above, the application of the color correction parameters in the selected or new profile indicates, for each type of segment, which colors may present problems to the identified, associated user and which alternate presentations should be used in hopes of alleviating the identified user's problems in discriminating between certain problematic colors.

Step 714 then optionally annotates the digital image copy of the document to indicate that color correction has been applied. The annotation may include specific reference to the alterations made for each color (e.g., "Red text has been altered to Black"). Further, for example, the annotation may include annotating the entire document by generating a cover sheet to precede the first image of the altered digital image copy of the document or may indicate corrections by adding a footer on each altered image of the digital image copy indicating colors that have been altered thereon. Any suitable notification may thus be generated by step 714 for application to the corrected color digital image copy of the original document image.

Lastly, step 716 utilizes the corrected digital image copy by outputting the color corrected digital image data for use by the identified user. As noted above, such utilization may include output to a printer to create a modified hardcopy or to a display to present the altered images, may include storage of the altered image data for subsequent retrieval, and/or may include transmission of the color corrected digital image copy for printing, storage, or other use by a remote user.

As noted above, a user input module and associated user input device may be associated with the systems and methods for interacting with a user to generate a new profile and to associate color parameters with a particular identified user and with particular types of segments of an original document image. FIGS. 8 through 13 represent an exemplary graphical user interface display on a user I/O device for interacting with such a user to define a user profile and to associate the profile with an identified user.

Figure 8:
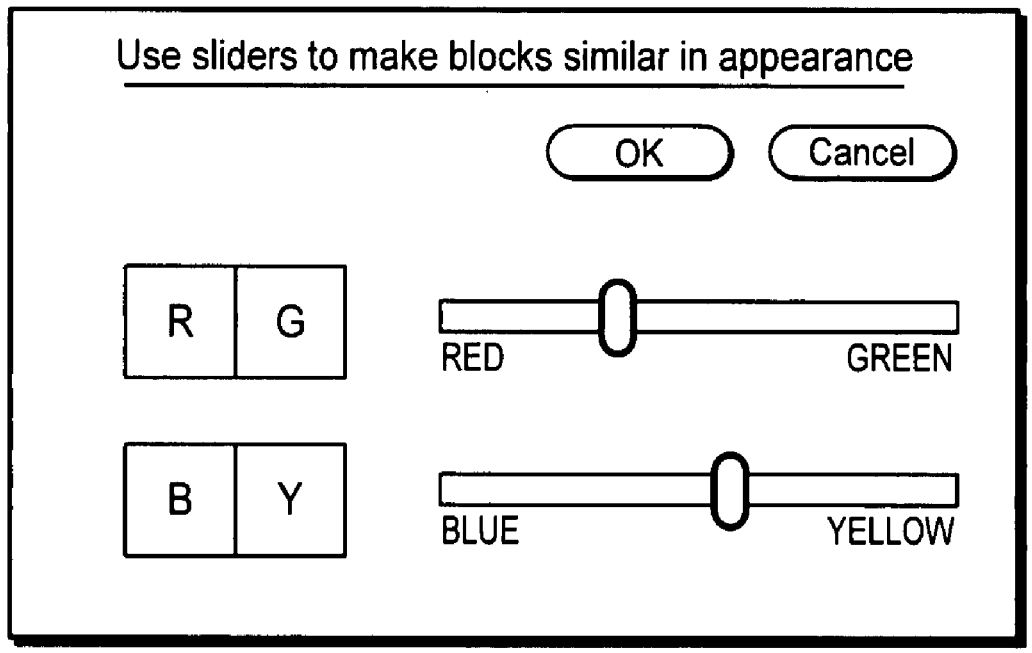
FIGS. 8 through 13 are exemplary displays of an interactive graphical user interface useful in connection with systems and methods to generate and utilize a color correction profile in accordance with features and aspects hereof.

FIG. 8 represents an exemplary user interactive display providing comparison color information to a user. For example, a red block and a green block are presented, and a slide bar user interface input is presented to allow the user to identify the degree of color correction required. The user may them slide the slide bar input until the red and green blocks appear most similar. From the input, features and aspects hereof may apply well known techniques to determine the degree of correction needed for this user to distinguish red from green colors. Difficulty in distinguishing between red and green is one common symptom of color-blindness. In addition, distinguishing between blue and yellow is yet another typical symptom of color-blindness. A similar display of a blue and yellow block and an associated slide bar may be presented to obtain the same input regarding distinguishing blue from yellow. By the user indicating when the associated two colors appear similar, a degree of color-blindness sensitivity for these color combinations may be determined and appropriate alternate presentations may then be identified.

Figure 9:
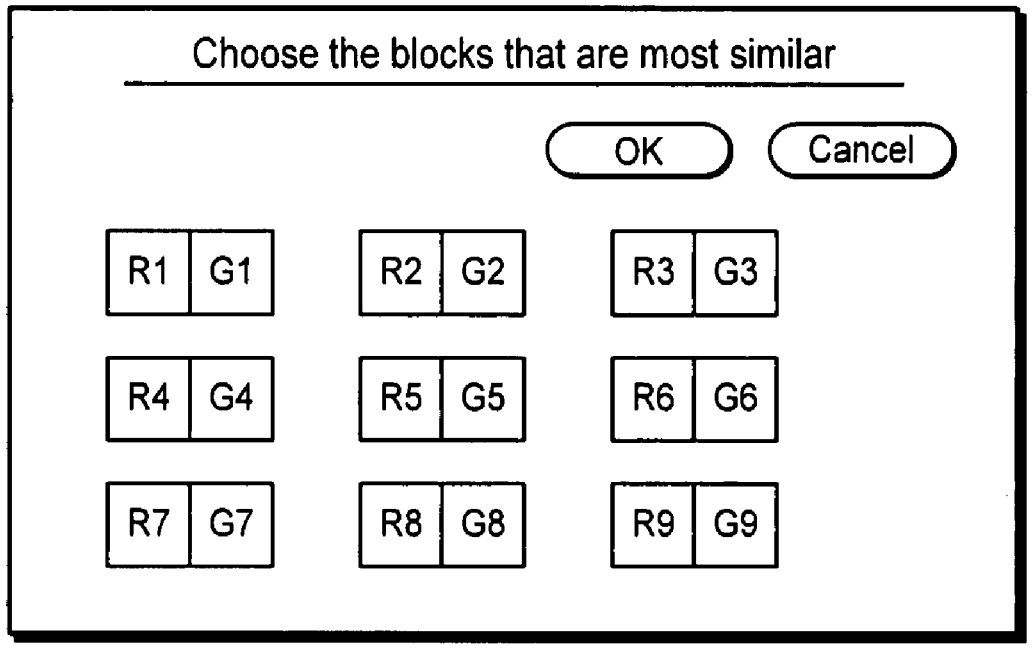

FIG. 9 provides another exemplary interactive user display wherein the color comparison information is presented as a series of pairs of color blocks where each pair presents a pre-determined level of intensity of two comparative colors (e.g., red versus green, blue versus yellow, etc.). The pairs are indicated on FIG. 9 as a level of red "R1" paired with a level of green "G1", another level of red "R2" paired with another level of green "G2", etc. The user selects (e.g., touches) the comparative blocks that appear to present the most similar colors. By selecting the relative colors that appear most similar, a degree of color-blindness for these comparative colors may be determined and alternate presentations may be determined. The exemplary interfaces of FIGS. 8 and 9 therefore define color correction parameters including problematic colors for the user and alternate presentations to be used to replace those problematic colors in a digital image copy of the document image to be used by the associated user. It is generally known in the art how to determine a level or degree of colorblindness for a user of a computer system to identify problematic colors, the degree of the problem, and hence alternate colors or patterns (or other alterations that may compensate for the viewer's deficiency in discriminating between problematic colors. For example, U.S. Pat. No. 5,589,898 presents a number of well known techniques applying a computer to identify problematic colors for a viewer and to identify potential alternative presentations to compensate for the viewer's deficiencies. As noted above, the alternate presentation may include changes to the colors, changes to the contrast or level of the colors, changing the colors to grayscales, changing the colors to hatch patterns, changing the colors to flashing/blinking pixels (e.g., for presentation on a display), etc.

Figure 10:
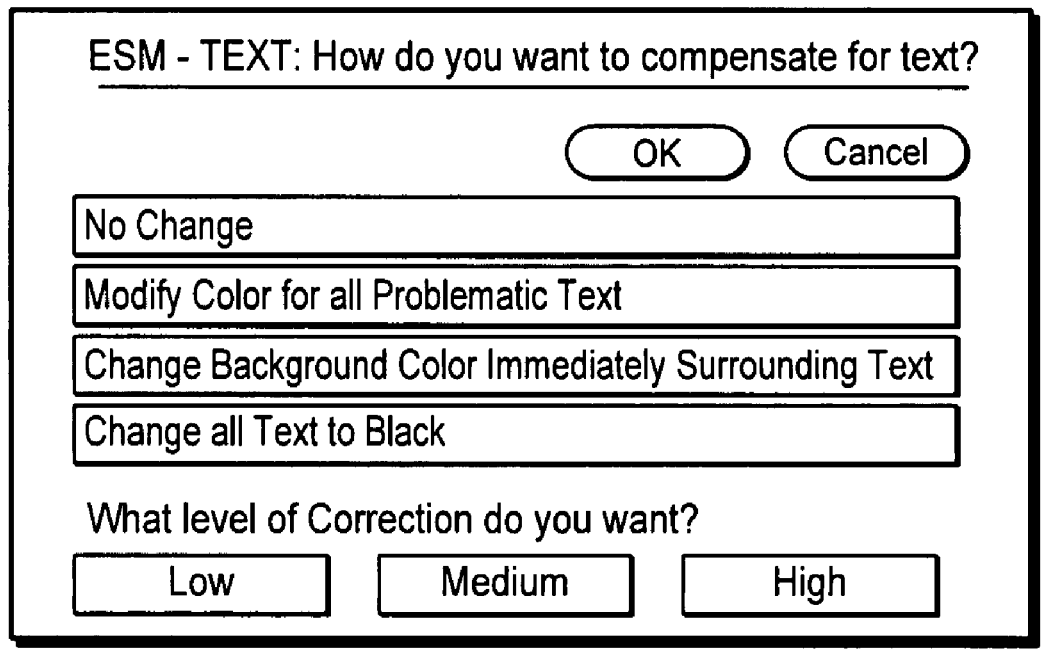
Figure 11:
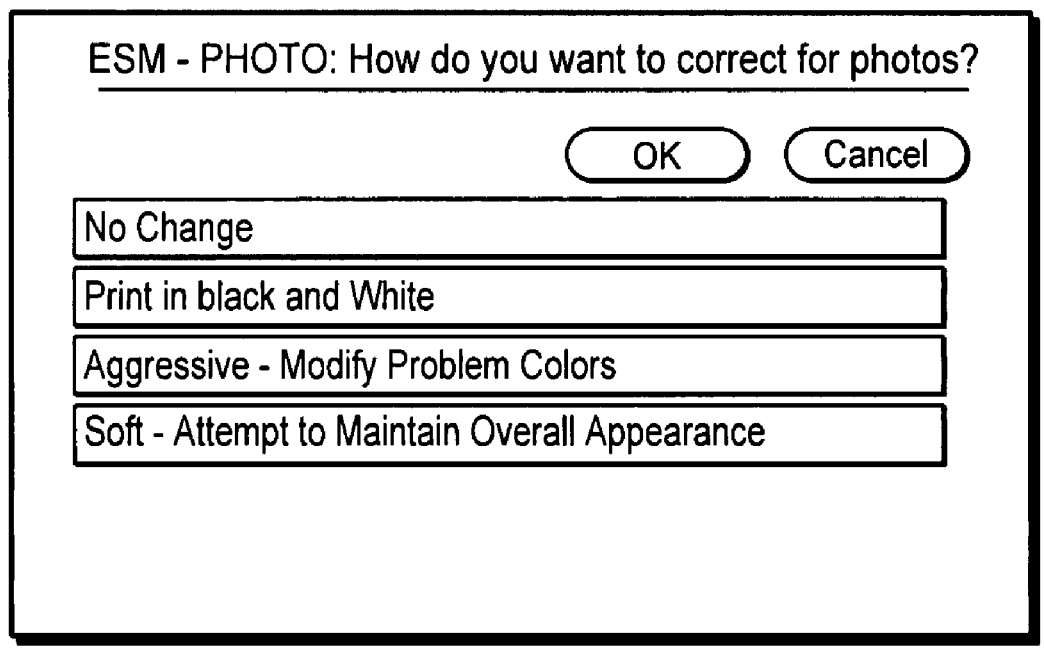

Having so identified problematic colors and alternative colors to be used in replacing the problematic colors, FIGS. 10 and 11 represent exemplary interactive user interfaces for permitting the user to identify how the defined color correction parameters should be applied to each of a plurality of segment types in the original document image.

FIG. 10 presents a number of options to a user regarding how the color correction parameters could be applied to objects associated with the text type of segment in the generated copy. The user may select a "no change" parameter setting indicating that no correction should be applied to textual objects in the text type of segment. Alternatively the user may select among a variety of other parameter settings for the manner in which color correction parameters should be applied to text objects associated with the text type of segment in the generated color corrected digital image copy. For example, the rectangular bounding box of background pixels upon which text glyphs are imposed could be altered relative to the color of the text glyphs (or vice versa).

In addition, the user may select whether a "low", "medium", or "high" level of such correction should be applied to the textual segments indicating one of various levels of correction to be applied. The color correction parameters (for each segment type) may therefore include multiple definitions for varying levels or degrees of correction. Thus any of several alternate presentations may be selected based on the level of correction requested by the profile's user.

FIG. 11 presents a similar interactive user interface to allow the user to determine how, if at all, photographic segments of the document image are to be corrected based on the earlier determination of problematic colors and associated alternate presentations. The user may select a "no change" parameter setting to indicate that no color correction should be applied to the document image for objects in the photographic type of segment. In the alternative, the user may select among a number of alternative parameter settings for applying corresponding color correction to objects in the photographic type of segments. Similar user interactive interfaces may be provided for defining appropriate color correction for other types of segments in the generated color corrected digital image copy.

Figure 12:
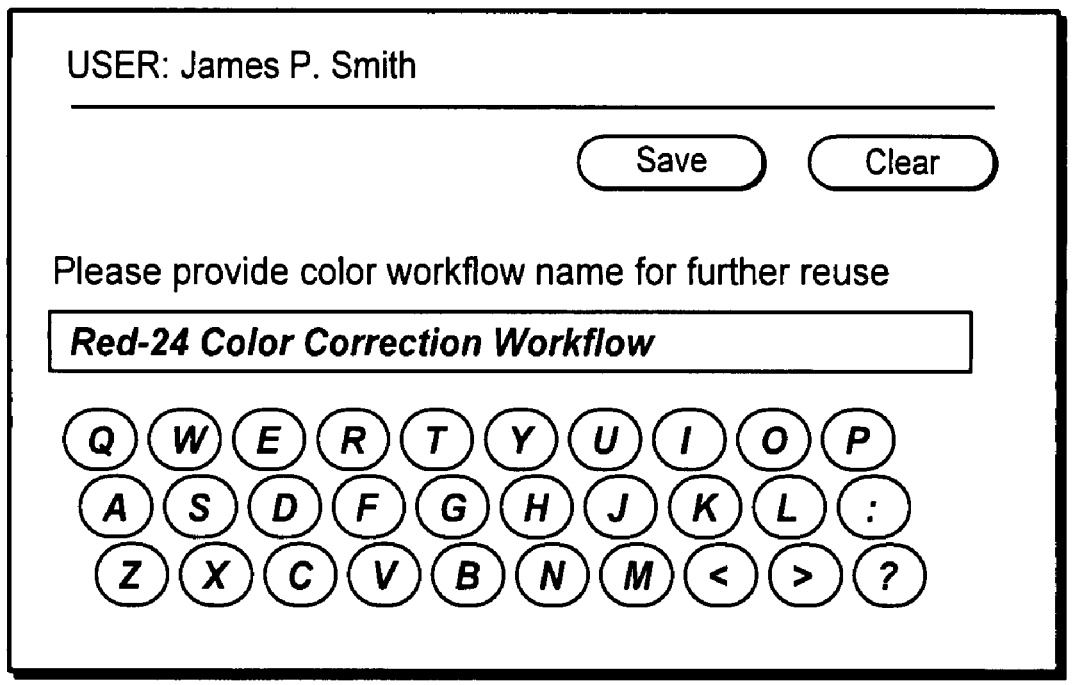
Figure 13:
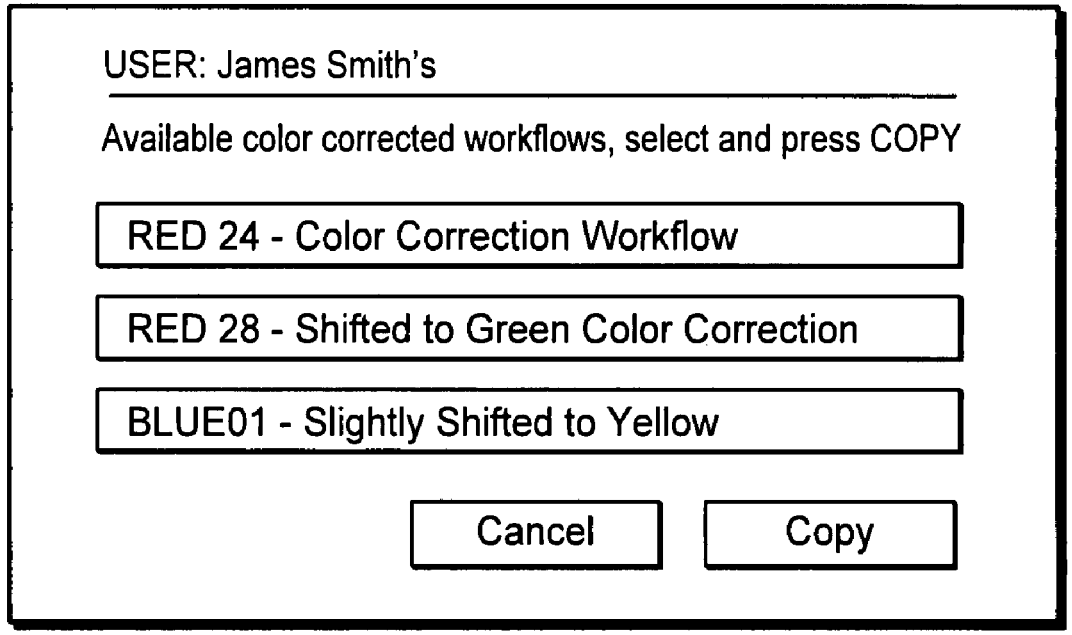

As noted above, a defined color correction profile may be stored and associated with an identified user. FIG. 12 shows an exemplary interactive user interface allowing a user to provide a name for the particular color correction profile (e.g., workflow) and to associate that color correction profile with an identified user. Using such an interface, the user may save a newly defined color correction profile under a particular identified profile name (e.g., workflow name) and may associate the profile with a particular, previously defined user name. At a subsequent time, when generating color corrected digital image data from an original document image, the user interface exemplified in FIG. 13 allows the interactive user to select among a plurality of previously defined profiles associated with an identified user to select a profile to be used in generating one or more color corrected copies of the original document image.

Those of ordinary skill in the art will readily recognize that the systems and methods described above may also be employed to generate a plurality of color corrected copies from an original document image wherein each copy may apply different color correction profiles for use by different associated identified users. Thus a system was may generate a mixture of copies of a document (e.g., a mixed job) wherein each copy may selectively be generated as an uncorrected copy or may apply particular identified correction according to a selected profile for a selected identified user.

While the invention has been illustrated and described in the drawings and foregoing description, such illustration and description is to be considered as exemplary and not restrictive in character. Various embodiments of the invention and minor variants thereof have been shown and described. In particular, those of ordinary skill in the art will readily recognize that exemplary methods discussed above may be implemented as suitably programmed instructions executed by a general or special purpose programmable processor or may be implemented as equivalent custom logic circuits including combinatorial and/or sequential logic elements. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A computer operable method for color correction in generating a digital image copy of scanned document image, the method comprising:

logically dividing the scanned document image into a plurality of segments wherein each segment comprises a subset of pixels of the scanned document image wherein the subset of pixels that comprise each segment have a common type attribute value in the scanned document image and wherein each segment comprises a subset of pixels that is smaller than the entire scanned document image;

obtaining a color correction profile for an identified user wherein the color correction profile indicates problematic colors to be altered in an alternate presentation of a digital image copy of the scanned document image based on the identified user's visual preferences and wherein the color correction profile includes a plurality of color correction parameters each parameter defining a problematic color and a manner in which to alter the problematic color wherein the plurality of color correction parameters collectively define the alternate presentation and wherein each of the plurality of color correction parameters is associated with a corresponding segment of the plurality of segments;

generating the digital image copy of the scanned document image using an alternate presentation in accordance with the color correction profile wherein the step of generating further comprises altering problematic colors in the subset of pixels of a segment of the scanned document image in accordance with corresponding color parameters in the color correction profile; and outputting the generated digital image copy for use by the identified user, wherein the color correction profile specifies color correction parameters for an alternate presentation of the problematic colors to correct for colorblindness of the identified user.

2. The method of claim 1 wherein the step of obtaining the color correction profile further comprises:

presenting the identified user with visual color comparison information;

receiving input from the identified user identifying problematic colors in the color comparison information presenting visual problems for the identified user; and defining the color correction profile based on the user input indicative of the alternate presentation to use when generating the digital image copy from the scanned document image.

3. The method of claim 1 wherein the step of obtaining further comprises:

retrieving a previously stored color correction profile for use in generating the digital image copy from the scanned document image.

4. The method of claim 1 wherein the color correction profile includes first color correction parameters associated with a first type of segment of the plurality of segments and includes second color correction parameters associated with a second type of segment of the plurality of segments, wherein the step of generating further comprises:

altering colors of a segment of the first type of segment in the scanned document image in accordance with the first color correction parameters; and altering colors of a segment of the second type of segment in the scanned document image in accordance with the second color correction parameters.

5. The method of claim 1 wherein the color correction profile includes text color parameters associated with a text type of segment of the plurality of segments and includes photograph color parameters associated with a photographic type of segment of the plurality of segments and includes graphic color parameters associated with a graphic type of segment of the plurality of segments and includes solid area color parameters associated with a solid area type of segment of the plurality of segments and includes background color parameters associated with a background type of segment of the plurality of segments, wherein the step of generating further comprises:

altering colors of a segment of the text type of segment in the scanned document image in accordance with the text color parameters;

altering colors of a segment of the photographic type of segment in the scanned document image in accordance with the photographic color parameters;

altering colors of a segment of the graphic type of segment in the scanned document image in accordance with the graphic color parameters;

altering colors of a segment of the solid area type of segment in the scanned document image in accordance with the solid area color parameters; and altering colors of a segment of the background type of segment in the scanned document image in accordance with the background color parameters.

6. The method of claim 1 wherein the step of generating further comprises:

annotating said generated digital image copy to indicate that an alternate presentation has been applied.

7. A computer operable method for color correction in generating a digital image copy of a scanned document image, the method comprising:

logically dividing the scanned document image into a plurality of segments wherein each segment comprises a subset of pixels of the scanned document image wherein the subset of pixels that comprise each segment have a common type attribute value in the scanned document image and wherein each segment comprises a subset of pixels that is smaller than the entire scanned document image;

obtaining a color correction profile for an identified user wherein the color correction profile includes a plurality of color correction parameters each associated with a different corresponding segment of the plurality of segments wherein the color correction profile includes first color correction parameters associated with a first type of segment of the plurality of segments and includes second color correction parameters associated with a second type of segment of the plurality of segments wherein each color correction parameter defines a problematic color and a manner in which to alter the problematic color and wherein the color correction parameters collectively define an alternate presentation;

generating the digital image copy of the scanned document image using the alternate presentation in accordance with the color correction profile wherein the step of generating further comprises altering colors in a segment of the scanned document image in accordance with corresponding color parameters in the color correction profile;

wherein the step of generating further comprises:
altering colors of a segment of the first type of segment in the scanned document image in accordance with the first color correction parameters; and
altering colors of a segment of the second type of segment in the scanned document image in accordance with the second color correction parameters; and outputting the generated digital image copy for use by the identified user.

8. The method of claim 7 wherein the step of obtaining the color correction profile further comprises:

presenting the identified user with visual color comparison information;
receiving input from the identified user identifying problematic colors in the color comparison information presenting visual problems for the identified user; and
defining the color correction profile based on the user input indicative of the alternate presentation to use when generating the digital image copy from the scanned document image.

9. The method of claim 8 wherein the step of generating further comprises:
annotating said generated digital image copy to indicate that color correction has been applied.

10. The method of claim 8 wherein the step of obtaining further comprises:
retrieving a previously stored color correction profile for use in generating the digital image copy from the scanned document image.

11. The method of claim 7 wherein the color correction profile includes text color parameters associated with a text type of segment of the plurality of segments and includes photograph color parameters associated with a photographic type of segment of the plurality of segments and includes graphic color parameters associated with a graphic type of segment of the plurality of segments and includes solid area color parameters associated with a solid area type of segment of the plurality of segments and includes background color parameters associated with a background type of segment of the plurality of segments, wherein the step of generating further comprises:
altering colors of a segment of the text type of segment in the scanned document image in accordance with the text color parameters;
altering colors of a segment of the photographic type of segment in the scanned document image in accordance with the photographic color parameters;
altering colors of a segment of the graphic type of segment in the scanned document image in accordance with the graphic color parameters;
altering colors of a segment of the solid area type of segment in the scanned document image in accordance with the solid area color parameters; and
altering colors of a segment of the background type of segment in the scanned document image in accordance with the background color parameters.

12. A computing system for color correction of a digital image copy of a scanned document image, the system comprising:

a memory for storing a color correction profile corresponding to an identified user wherein the profile specifies color correction parameters indicating problematic colors to be replaced in the digital image copy of the scanned document image to correct for colorblindness of the identified user, wherein the colors to be replaced indicated by the profile collectively define an alternate presentation for the digital image copy to be corrected;

a color corrected digital image copy generation module coupled with the memory to receive the color correction profile and coupled to receive the scanned document image and adapted to generate the digital image copy of the scanned document image for the identified user using the alternate presentation defined by the color correction profile; and an output module coupled with the color corrected digital image copy generation module to receive the generated digital image copy and to present the digital image copy to a user, wherein the color corrected digital image copy generation module further comprises a scanned document image segmenter for logically dividing the scanned document image into a plurality of segments, wherein each segment comprises a subset of pixels of the scanned document image and wherein the subset of pixels of each segment is smaller than the entire scanned document image, wherein the subset of pixels that comprise each segment have a common type attribute value in the scanned document image, wherein the color correction profile includes a plurality of color correction parameters each associated with a different corresponding segment of the plurality of segments, and wherein the color corrected digital image copy generation module is further adapted to generate the copy by replacing colors in the digital image copy of a segment of the scanned document image in accordance with corresponding color parameters.

13. The system of claim 12 further comprising:
a profile generator module operable to interact with the user to generate the color correction profile for the identified user,
wherein the profile generator module is operable to present color comparison information to the user and operable to interact with the user to identify problematic colors that present visual problems for the user and operable to identify the alternate presentation to replace the problematic colors in a generated digital image copy of the scanned document image.

14. The system of claim 12 wherein a plurality of color correction profiles are previously generated and stored for retrieval and wherein each of the color correction profiles is associated with a user and wherein the system further comprises:

a profile selector operable to interact with a user to select the color correction profile associated with the identified user from the plurality of color correction profiles.

15. The system of claim 12 wherein the color correction profile includes first color parameters associated with a first type of segment of the plurality of segments and includes second color parameters associated with a second type of segment of the plurality of segments, wherein the color corrected digital image copy generation module is further adapted to generate said digital image copy by replacing colors of a segment of the first type of segment in the scanned document image in accordance with the first color parameters; and wherein the color corrected digital image copy generation module is further adapted to generate said digital image copy by replacing colors of a segment of the second type of segment in the scanned document image in accordance with the second color parameters.

16. The system of claim 12 wherein the color correction profile includes text color parameters associated with a text type of segment of the plurality of segments and includes photograph color parameters associated with a photographic type of segment of the plurality of segments and includes graphic color parameters associated with a graphic type of segment of the plurality of segments and includes solid area color parameters associated with a solid area type of segment of the plurality of segments and includes background color parameters associated with a background type of segment of the plurality of segments, wherein the color corrected digital image copy generation module is further adapted to generate said digital image copy by replacing colors of a segment of the text type of segment in the scanned document image in accordance with the text color parameters;

wherein the color corrected digital image copy generation module is further adapted to generate said digital image copy by replacing colors of a segment of the photographic type of segment in the scanned document image in accordance with the photographic color parameters;

wherein the color corrected digital image copy generation module is further adapted to generate said digital image copy by replacing colors of a segment of the graphic type of segment in the scanned document image in accordance with the graphic color parameters;

wherein the color corrected digital image copy generation module is further adapted to generate said digital image copy by replacing colors of a segment of the solid area type of segment in the scanned document image in accordance with the solid area color parameters; and wherein the color corrected digital image copy generation module is further adapted to generate said digital image copy by replacing colors of a segment of the background type of segment in the scanned document image in accordance with the background color parameters.

17. The system of claim 12 wherein the color corrected digital image copy generation module further comprises:

an annotator for annotating said generated digital image copy to indicate that color correction has been applied.

18. A multi-function device adapted to generate a digital image copy of a scanned document image with alternate presentation of problematic colors, the device comprising:

a scanner to generate a digital image copy of the scanned document image;

a color correction profile specifying color correction parameters indicating problematic colors to be replaced in the digital image copy of the scanned document image to correct for color blindness of an identified user wherein the colors to be replaced indicated by the profile collectively define an alternate presentation for the digital image copy to be corrected;

a color corrected digital image copy generation module coupled to receive the digital image copy and coupled to receive the color correction profile and adapted to replace colors in the digital image copy of the scanned document image in accordance with the color correction profile to generate an altered digital image copy; and an image output module coupled to receive the altered digital image copy and adapted to present the altered digital image copy to the identified user, wherein the color corrected digital image copy generation module further comprises a scanned document image segmenter for logically dividing the scanned document image into a plurality of segments, wherein each segment comprises a subset of pixels of the scanned document image and wherein the subset of pixels of each segment is smaller than the entire scanned document image, wherein the subset of pixels that comprise each segment have a common type attribute value in the scanned document image, and wherein the color corrected digital image copy generation module is further adapted to generate the altered digital image copy by replacing colors in the altered digital image copy of a segment of the scanned document image in accordance with corresponding color parameters.

19. The multi-function device of claim 18 further comprising:

a memory for storing a plurality of color correction profiles each associated with a corresponding identified user; and a profile selection module coupled to the user input module and adapted to select said color correction profile from the plurality of color correction profiles based on user input indicating an identified user.

20. The multi-function device of claim 18 further comprising:

wherein the scanned document image segmenter is further adapted to segment the scanned document image into a first segment and a second segment, wherein the color correction profile includes first color correction parameters and second color correction parameters, and wherein the color corrected digital image copy generation module is further adapted to replace colors in the first segment based on the first color correction parameters and is further adapted to replace colors in the second segment based on the second color correction parameters.

21. The multi-function device of claim 20 wherein the first segment is a text segment containing textual elements of the scanned document image and wherein the second segment is a non-text segment containing non-textual elements of the scanned document image.

22. The multi-function device of claim 18 wherein the color correction profile specifies color correction parameters for an alternate presentation of the problematic colors to correct for colorblindness of a user.

* * * * *